United States Patent
Binkert et al.

(10) Patent No.: US 8,130,754 B2
(45) Date of Patent: Mar. 6, 2012

(54) ON-CHIP AND CHIP-TO-CHIP ROUTING USING A PROCESSOR ELEMENT/ROUTER COMBINATION

(75) Inventors: Nathan Binkert, Redwood City, CA (US); Moray McLaren, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 385 days.

(21) Appl. No.: 12/501,000

(22) Filed: Jul. 10, 2009

(65) Prior Publication Data

US 2011/0010525 A1    Jan. 13, 2011

(51) Int. Cl.
*H04L 12/50* (2006.01)
*H04L 12/66* (2006.01)

(52) U.S. Cl. ........................... 370/386; 370/463

(58) Field of Classification Search .................. 370/386, 370/463, 229, 285, 329, 341, 351, 389, 401, 370/422, 431, 433, 464, 465; 455/450, 509
See application file for complete search history.

(56) References Cited

U.S. PATENT DOCUMENTS

| | | | |
|---|---|---|---|
| 5,640,599 A * | 6/1997 | Roskowski et al. | 710/29 |
| 5,864,535 A * | 1/1999 | Basilico | 370/231 |
| 6,728,238 B1 * | 4/2004 | Long et al. | 370/352 |
| 6,735,197 B1 * | 5/2004 | Duschatko et al. | 370/386 |
| 2002/0027917 A1 * | 3/2002 | Sugai et al. | 370/394 |

* cited by examiner

*Primary Examiner* — Phirin Sam
*Assistant Examiner* — Blanche Wong
(74) *Attorney, Agent, or Firm* — Theodore C. McCullough

(57) ABSTRACT

A system and method is shown for on-chip and chip-to-chip routing. The system and method includes a processor element residing on a processor die to process a data packet received at the processor die. The system and method also include a router residing on the process die to route the data packet received at the processor die. Further, the system and method includes a switch core residing on the processor die to switch a communication channel along which the data packet is to be transmitted. Additionally, the system and method includes a switch core to identify a destination processing element and router (PE/R) module for a data packet, the switch core and the destination PE/R module residing on a common processor die. Moreover, the system and method includes a communication channel to operatively connect the switch core and the destination PE/R module on the common processor die.

18 Claims, 14 Drawing Sheets

ON-CHIP AND CHIP-TO-CHIP ROUTING USING A PROCESSOR ELEMENT/ROUTER COMBINATION

BACKGROUND

Multi-core based computing may be used to solve a number of data intensive problems. Computers with multiple cores can be implemented as compute blades in a blade rack, a plurality of computers organized as one or more computing clusters, or some other suitable organization. These computers with multiple cores can be used within a data center, server farm, or some other suitable facility.

BRIEF DESCRIPTION OF THE DRAWINGS

Some embodiments of the invention are described, by way of example, with respect to the following figures.

DETAILED DESCRIPTION

Illustrated is a system and method for on-chip interconnect and chip-to-chip routing within a domain. Shown is a PE/R module that resides on a processor die to process and route data packets. A processor die, as used herein, is a block of semiconducting material, on which a given functional circuit is fabricated. A PE, as used herein, is any on-die resource that utilizes data communicated across a network and includes, for example, a Central Processing Unit (CPU), a cache, a memory, or a special purpose unit. Also residing on the processor die is a switching core. The router of the PE/R determines the route or direction the data packet is to take, whereas the switching core ensures that the data packet arrives at the destination. Operatively connecting the PE/R and the switching core are one or more logical or physical communication channels. These communication channels may be copper based, or silicon waveguide based. Using these communication channels, data packets may be routed between PE/R residing on the same processor die. This is referenced herein as on-chip interconnect based routing. Further, using these same communication channels, data packets may be routed to a PE/R(s) residing on distinct processor dies. This is referenced herein as chip-to-chip routing. As will be more fully discussed below, the destination of a data packet may be identified through the use of a global address. A global address is a numeric value used to uniquely identify a PE/R and/or an integrated Network Interface (NI) residing on a processor die. In some example embodiments, the global address is allocated by the processor die, allocated at the time of manufacture of the processor die, or locally administered by a system administrator. Example global addresses include a Media Access Control (MAC) address, Globally Unique Identifier (GUID), or a Universally Unique Identifier (UUID). In some example embodiments, a switch value is associated with a data packet, where the switch value denotes a particular PE/R residing on a processor die.

Figure 1:
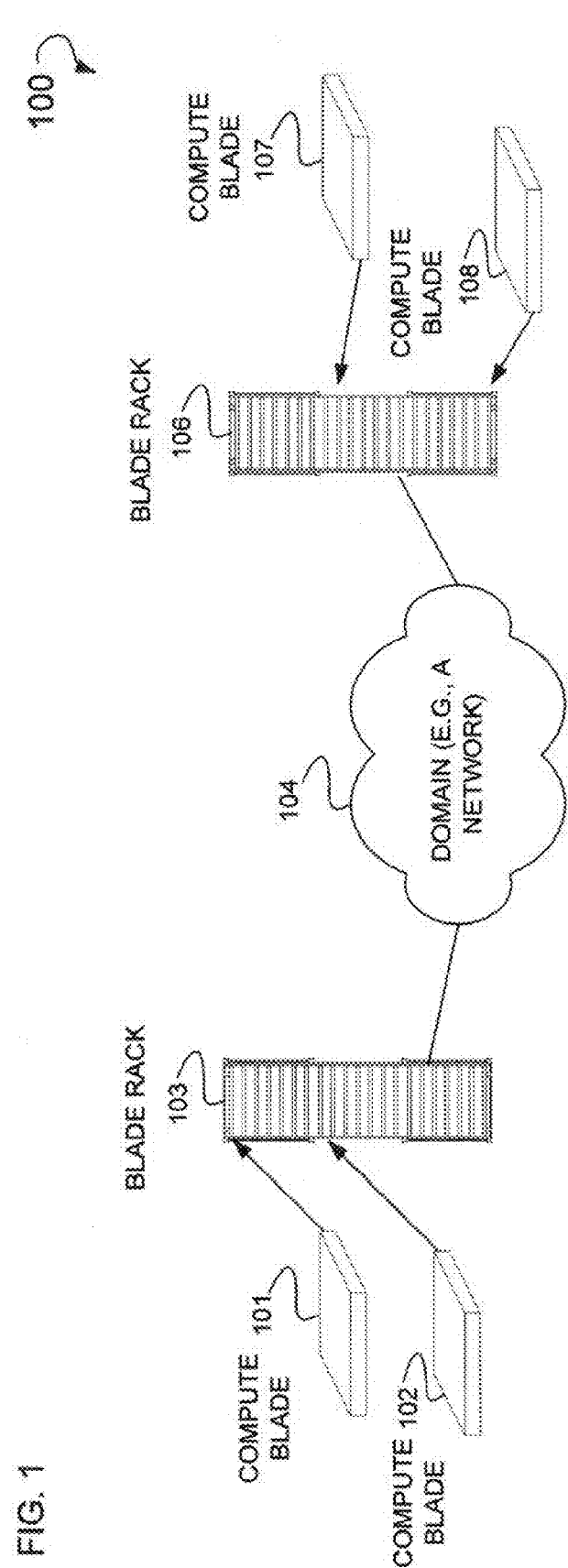
FIG. 1 is a diagram illustrating a system, according to an example embodiment, used to facilitate on-chip and chip-to-chip routing.

FIG. 1 is a diagram illustrating an example system 100 used to facilitate on-chip and chip-to-chip routing. Shown is an example compute blade 101 and compute blade 102 that are included as part of the blade rack 103. The blade rack 103 and/or compute blades 101, and 102 are operatively connected to a domain 104. Operatively connected includes a logical or physical connection. The domain 104 is a network and includes a Local Area Network (LAN), a Wide Area Network (WAN), or some other suitable type network and associated topology. An example compute blade 107 and 108 are shown as part of the blade rack 106. Blade rack 106 and/or compute blades 107 and 108 are operatively connected to the domain 104. In some example embodiments, a computer system in the form of a computing cluster, or other suitable computer system, is implemented in lieu of the blade rack 103 and blade rack 106. This computing cluster would implement the systems and methods illustrated herein. A computer blade, as referenced herein, is a computer system with memory to read input commands and data, and a processor to perform commands manipulating that data. As will be more fully illustrated below, PE/Rs are implemented on one or more of the compute blades 101, 102, 107 or 108 that route data packets between the PE/Rs.

Figure 2:
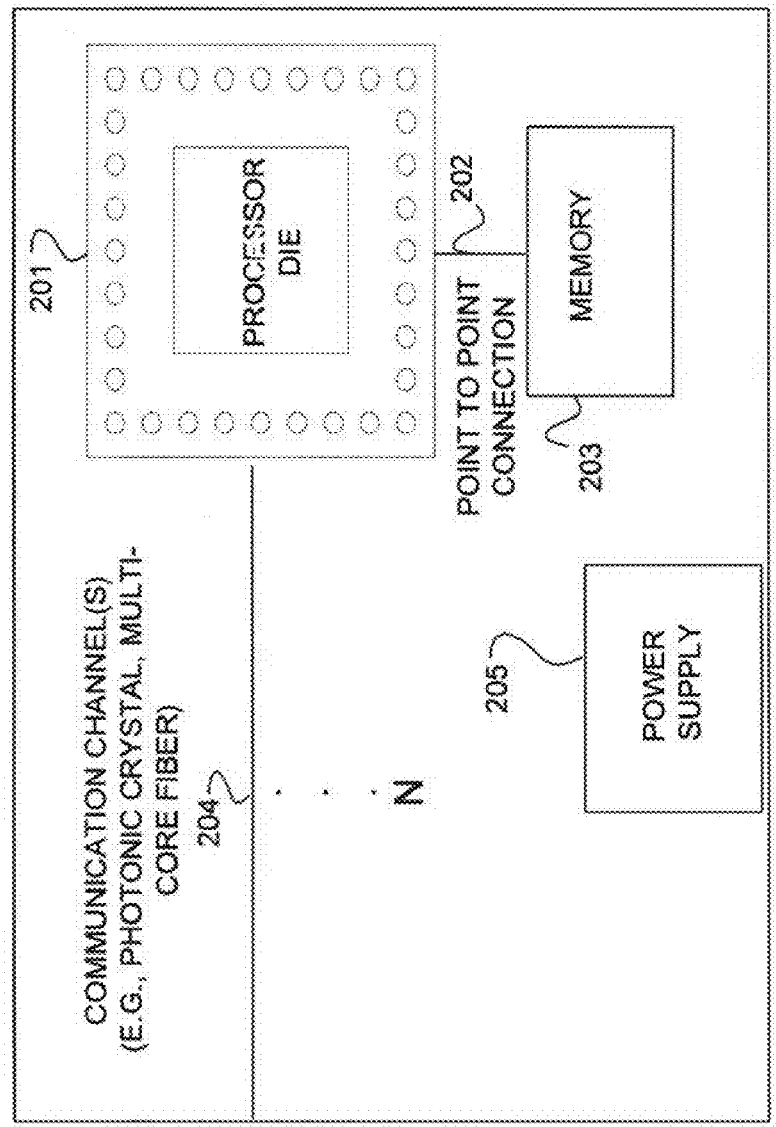
FIG. 2 is a diagram of a compute blade, according to an example embodiment, utilizing a processor die that includes a plurality of Processing Element/Router (PE/R) combinations.

FIG. 2 is a diagram of an example compute blade 101 utilizing a processor die that includes a plurality of PE/R combinations connected via a plurality of communication channels. Shown is a processor die 201 that resides on the compute blade 101. Operatively connecting the compute blade 101 to the additional computer blades 102, 107 and 108 is a communication channel(s) 204. This communication channel(s) 204 may be a point to point multi-core fiber-based, or point to point photonic crystal based. Operatively connected to the processor die 201 is a further memory 203. This memory 203 may be a Static Random Access Memory (SRAM), or Dynamic Random Access Memory (DRAM). The connection 202 between processor die 201 and memory 203 may be a point to point connection of the type illustrated above. Further, residing upon the processor die 201 is a power supply 205. In some example embodiments, a plurality of processor dies are implemented in addition to the processor die 201. Additionally, as will be more fully illustrated below a plurality of PE/R combinations may be implemented on a single processor die 201.

Figure 3:
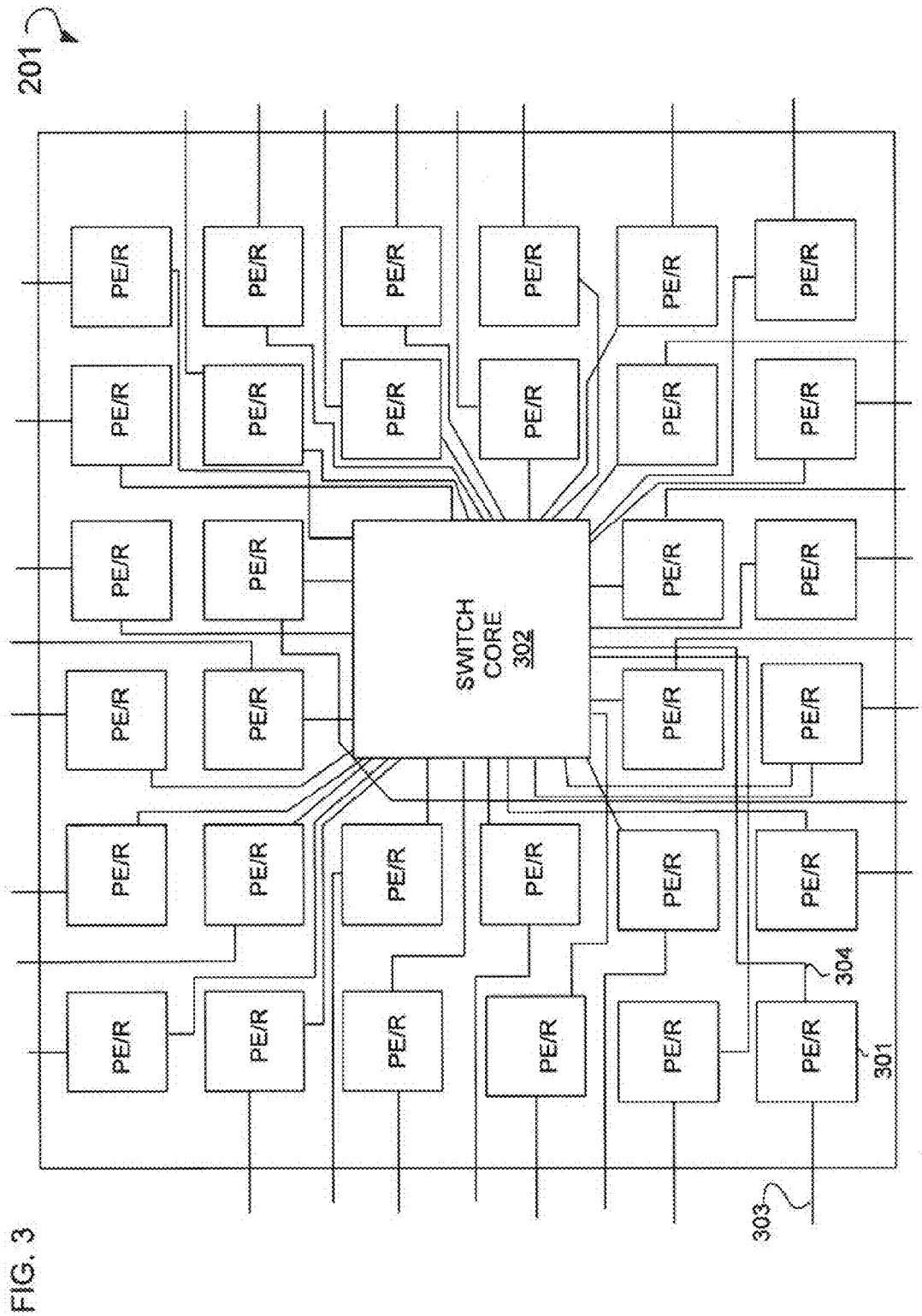
FIG. 3 is a diagram of a processor die, according to an example embodiment, illustrating a plurality of PE/R combinations, and interconnects between these PE/Rs, and a switch core.

FIG. 3 is a diagram of an example processor die 201 illustrating a plurality of PE/R combinations and interconnects between these PE/Rs, and a switch core. Shown are 32 PE/Rs that reside upon the processor die 201. In addition to these PE/R combinations, a switch core 302 is illustrated that directs data packets between PE/R combinations. Also illustrated is a bidirectional communication channel 303 whose inbound communication channel allows for traffic (e.g., data packets) to be received by the PE/R 301. The communication channel 303 may be a physical or logical connection. Additionally, this communication channel 303 may be optical fiber based, copper based, or photonic crystal based. A communication channel 304 is illustrated to allow for traffic (e.g., data packets) to be routed out of the PE/R 301 to the switch core 302. Like the communication channel 303, this communication channel 304 may be a logical or physical connection. Further, the communication channel 304 may be copper based, or silicon waveguide based. Communication channel 303 of the PE/R may be connected in a variety of direct network topologies such as grids, meshes, a clos, or flattened butterflies networks.

Figure 4:
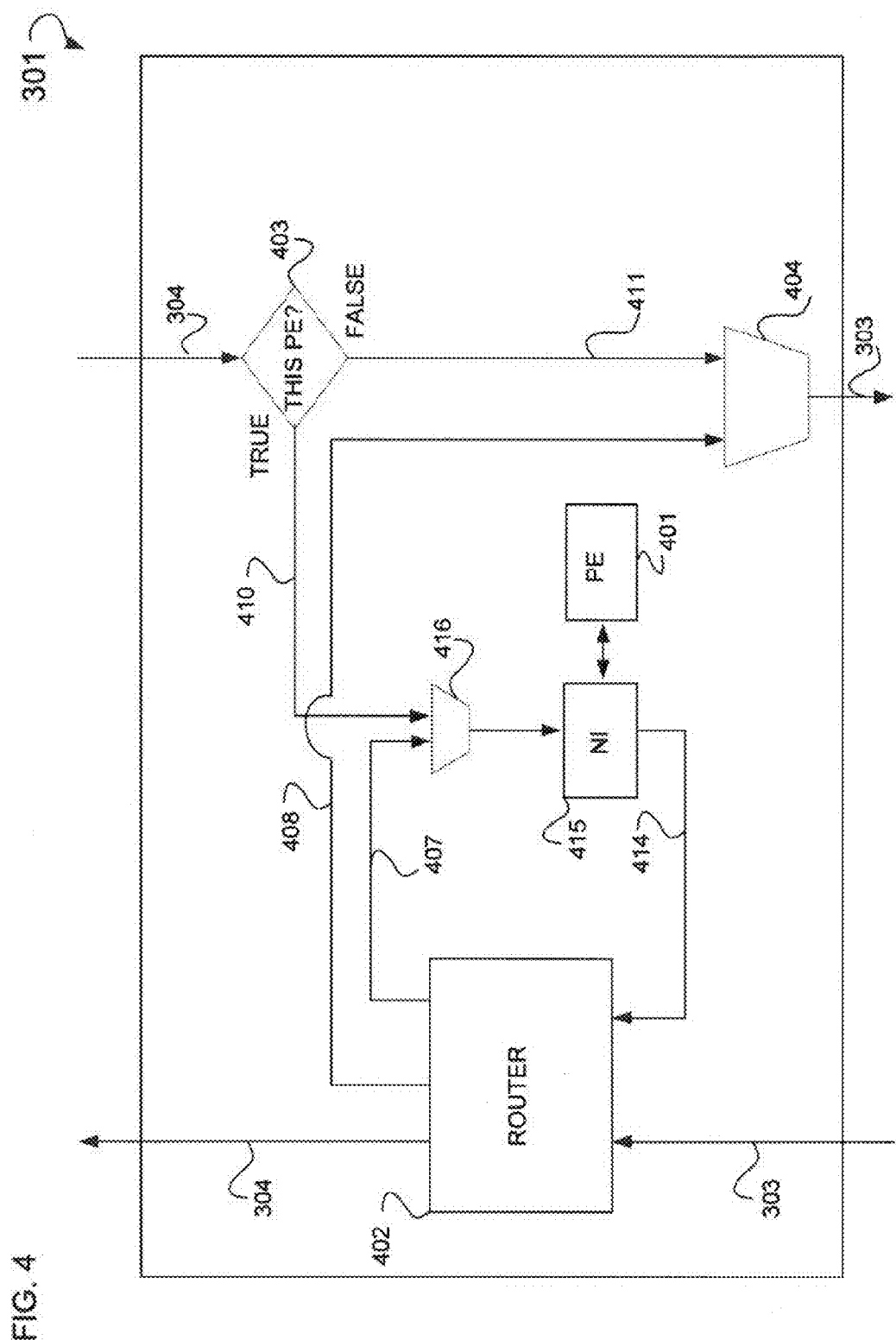
FIG. 4 is a diagram of a PE/R, according to an example embodiment.

FIG. 4 is a diagram of an example PE/R 301. Shown is a PE 401 and an integrated NI 415. Further, illustrated is a router 402, decisional operator module 403, and a multiplexer module(s) 404 and 416. Also shown is the communication channel 303 that allows traffic (e.g., data packets) to be received by the router 402 for routing. In some example embodiments, the communication channel 304 allows for traffic in the form of data packets to be routed out of or into the PE/R 301. In some example embodiments, the router 402 routes data packets to the PE 401 via a communication channel 407, multiplexer module 416 and NI 415. Data packets routed over the communication channel 407 are destined to be processed by the PE 401. Further, a communication channel 408 is shown that routes data packets from the router 402 to the multiplexer module 404 for routing out of the PE/R 301. Decisional operation module 403 determines whether incoming data packet is destined for the PE/R. In cases where decisional operation module 403 evaluates to "true," a data packet is routed to PE 401 again via the multiplexer module 416 and NI 415. In cases where decisional operation module 403 evaluates to "false," a data packet is routed along the communication channel 411 to allow these data packets to exit the PE/R 301 via the multiplexer 404 and communication channel 303 associated therewith. In some example embodiments, the PE 401 utilizes a data channel 414 to send data packets to the router 402. These data packets travelling along the communication channel 414 have been processed by the PE 401 and are in need of on-chip interconnect or chip-to-chip routing.

Figure 5:
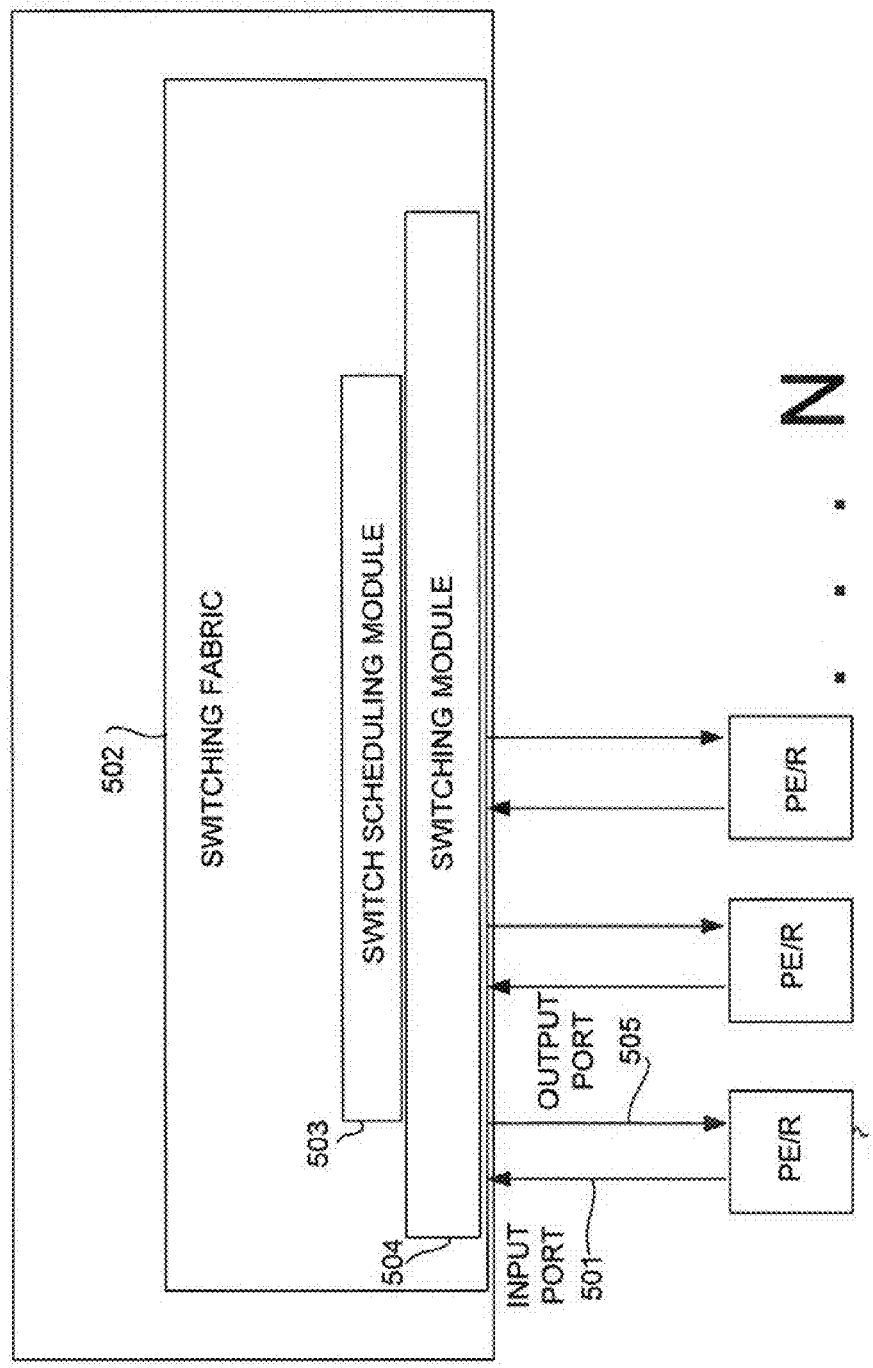
FIG. 5 is a diagram of a switch core, according to an example embodiment, used to direct data packets between PE/Rs residing on a processor die.

FIG. 5 is a diagram of an example switch core 302 used to direct data packets between PE/R residing on a processor die. Shown is an input port 501 and output port 505 to which are operatively connected the communication channel 304. Also shown is a switching fabric 502 that includes a switching module 504 and switch scheduling module 503. In some example embodiments, a data packet is received through the input port 501 by the switching module 504. The switching module 504 determines a destination PE/R (see e.g., FIG. 3, and the various processor dies illustrated therein) that that resides upon the processor die 201. This determination may be made based upon analyzing a switch port header value associated with the data packet that denotes a destination PE/R. In some example embodiments, the determination is made through analyzing data included in a control plane that is used to manage the incoming traffic for the PE/R 301. The switching module 504 is used to analyze the incoming data packets to determine a destination PE/R. Analysis made include stripping off a switch port header value that includes a destination PE/R address, and directing the data packet to the appropriate output port (see e.g:, output port 505) and output queue associated therewith. A switch scheduling module 503 is used to schedule, or otherwise prioritize, data packets within the various output queues associated with the various output ports for each PE/R. In some example embodiments, this prioritization is based upon a Quality of Service (QoS) requirement for the processing of a data packet by a PE/R. This QoS requirement may include meeting certain latency requirements, burstiness requirements for a PE/R, or other suitable requirements.

Figure 6:
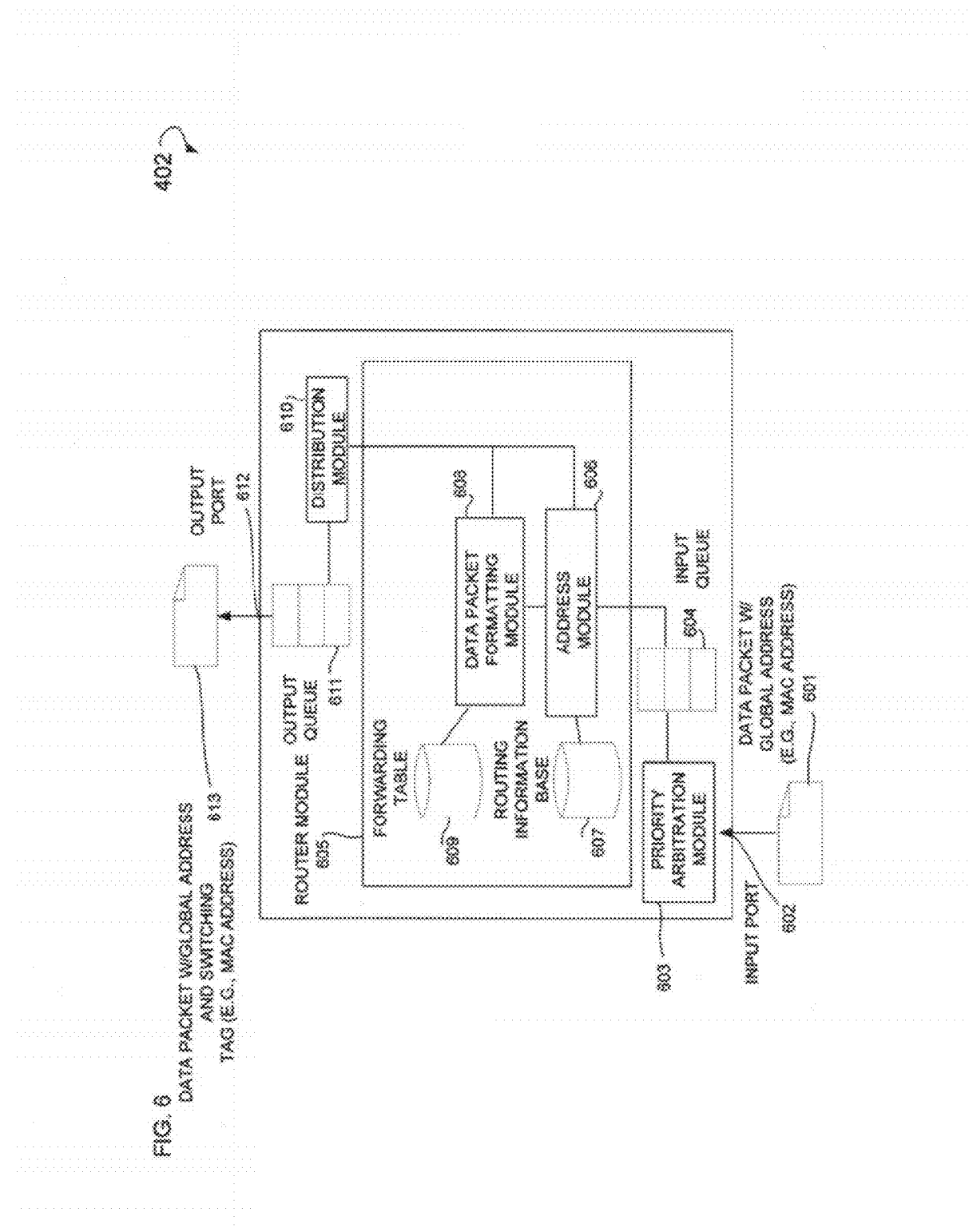
FIG. 6 is a diagram of a router, according to an example embodiment, associated with a PE in a PE/R.

FIG. 6 is a diagram of an example router 402 is associated with a PE in a PE/R. In some example embodiments, the router of the PE/R is capable of layer 1, 2 or 3 analyses as defined within the Open Systems Interconnection (OSI) reference model, or the Transmission Control Protocol/Internet Protocol (TCP/IP) stack model. Shown is a data packet with global address 601 (e.g., data packet 601) that is received via an input port 602. This input port 602 is operatively connected to the communication channel 303. A priority arbitration module 603 is illustrated that reside on the router 402. This priority arbitration module 603 enforces QoS restrictions for incoming data packets such as data packet 601. An input queue 604 is illustrated that includes the incoming data packets prioritized through the execution of the priority arbitration module 603. Address module 606 is illustrated that retrieves the PE/R address information for the data packet 601. This address information is retrieved from a routing information base 607 that may be organized as a hash table, trie, or other suitable data structure. The address module 606 may utilize a shortest path algorithm to determine a shortest path between the router 402 and another PE/R. This shortest path may be determined through the use of Dijkstra's algorithm, the Floyd-Warshall algorithm, or some other suitable algorithm used to determine the shortest path between end points in a network. A data packet formatting module 608 is illustrated that associates the address retrieved by address module 606 with the data packet 601. This association may be in the form of affixing a switch port value to the data packet 601 as a header. Further, this association may take the form of modifying a value that is part of a control plane used to manage incoming data packets for the router 402. The data packet formatting module 608 may retrieve link information from the forwarding table 609 for the next link on the path from the router 402 to the destination PE/R. The address module 606, routing information base 607, data packet formatting module 608 and forwarding table 609 all reside upon the router module 605. A distribution module 610 is illustrated that distributes the data packet 601 to the appropriate output queue(s) 611. The output queue 611 includes data packets that are prioritized based upon the aforementioned QoS requirements, wherein data packets with a higher priority are placed at the front of the output queue 611. The data packet 601 is routed through an output port 612 as a data packet with the global address and switching tag 613. The switching tag includes the switch port value as a header. The output port 612 is operatively connected to the communication channel 304.

Figure 7:
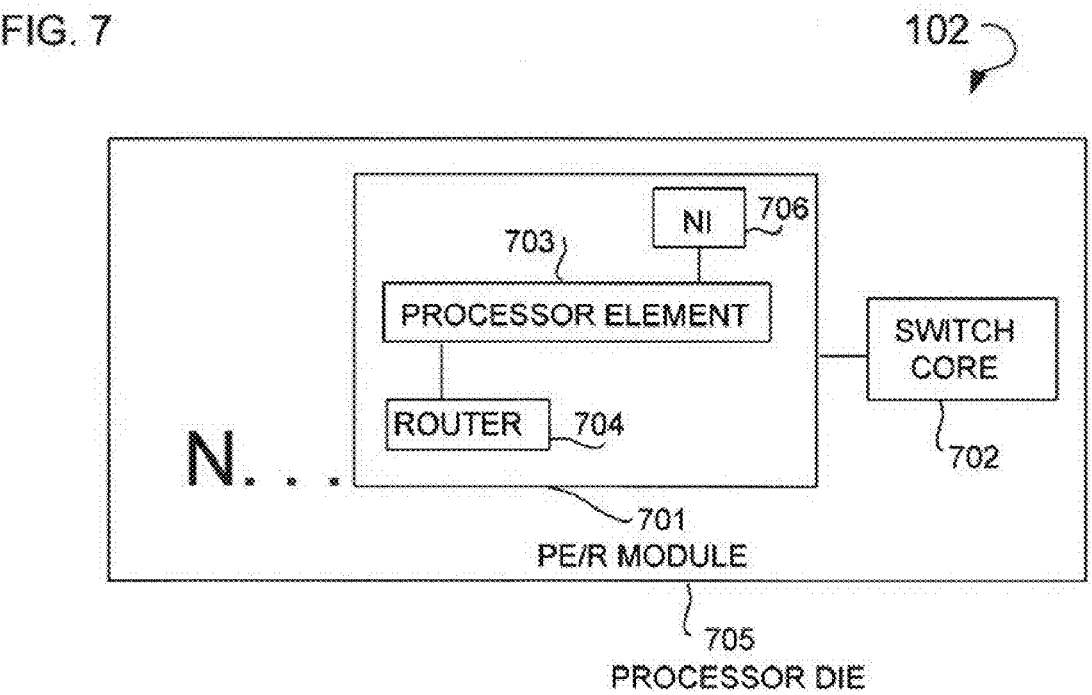
FIG. 7 is a block diagram of a computer system, according to an example embodiment, in the form of the compute blade used to perform on-chip and chip-to-chip routing.

FIG. 7 is a block diagram of an example computer system in the form of the compute blade 102 used to perform on-chip and chip-to-chip routing. These various blocks may be implemented in hardware, firmware, or software as part of the computer blade 101, or computer blade 102. Illustrated is a processor element 703 residing on a processor die 705 to process a data packet received at the processor die 705. Operatively connected to the processor element 703 is a router 704 residing on the process die 705 to route the data packet received at the processor die 705. Collectively the processor element 703 and router 704 are referenced herein as a PE/R module 701. Operatively connected to PE/R module 701 is a switch core 702 to switch a communication channel along which the data packet is to be transmitted. The switch core 702 resides on the processor die 705. In some example embodiments, the processor element 703 is a resource on the processor die that utilizes the data packet as transmitted across the communication channel. Further, the router 704 residing on the processor die may route the data packet to another processor element residing on another processor die. Additionally, the switch core 702 may switch the communication channel along which the data packet is transmitted from a first communication channel to a second communication channel, the first communication channel operatively connected to the processor element, and the second communication channel operatively connected to another processor element. Operatively connected to the processors element 703 is a NI 706 residing on the processor die to facilitate transmission of the data packet. In some example embodiments, the router 704 residing on the processor die 705 includes a priority arbitration module 603 to assign an input priority to the data packet, an address module 606 that retrieves an address for an additional processor element that resides on the processor die, a data packet formatting module 608 that associates the address with the data packet, and a distribution module 610 to assign an output priority to the data packet. In some example embodiments, the address is selected from at least one of a switch port header, or a control plane value.

Figure 8:
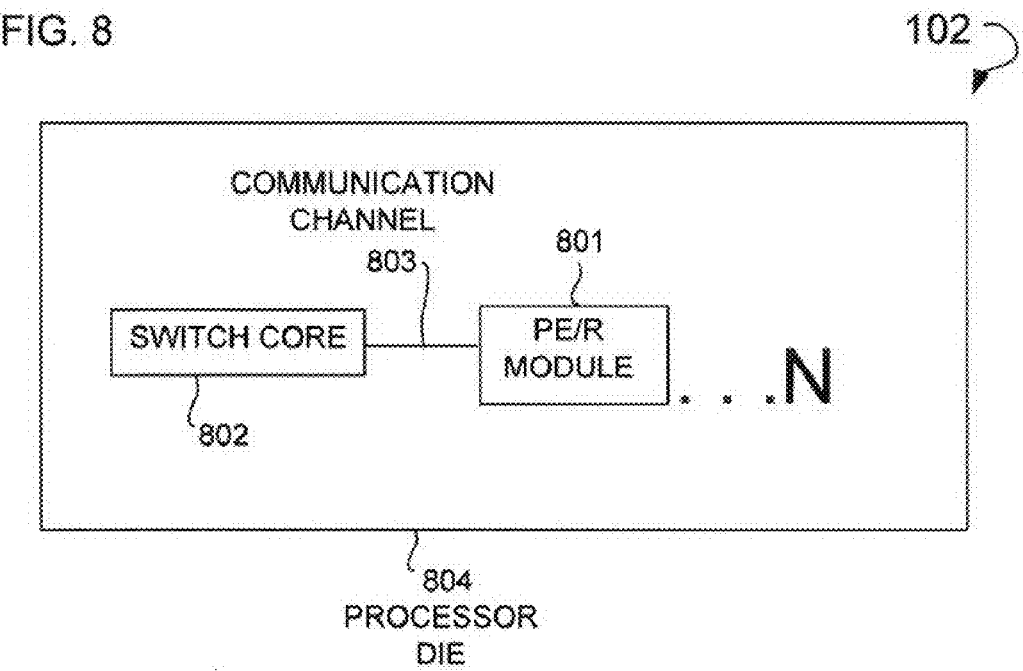
FIG. 8 is a block diagram of a computer system, according to an example embodiment, in the form of a switch core on a processor die.

FIG. 8 is a block diagram of an example computer system in the form of a compute blade 102 with a switch core and PE/R module on a common die. These various blocks may be implemented in hardware, firmware, or software as part of the computer blade 101, or computer blade 102. Shown is a switch core 802 to identify a destination PE/R module 801 (see e.g., PE/R 301) for a data packet, the switch core 802 and the destination PE/R 801 residing on a common processor die 804 (see e.g., processor die 201). The switch core 802 is operatively connected to the PE/R module 801. A communication channel 803 is shown to operatively connect the switch core 802 and the destination PE/R 801 on the common processor die 804. In some example embodiments, the switch core 802 includes the switch module 504 to identify the destination PE/R module for a data packet based upon an address for the PE/R module. Additionally, the switch core 802 may include the switch scheduling module 503 to determine an output priority for the data packet to be transmitted across the communication channel. Some example embodiments include the address that is a switch port value for the destination PE/R module. Further, in some example embodiment, the communication channel includes at least one of a copper-based communication channel, or a silicon waveguide based communication channel.

Figure 9:
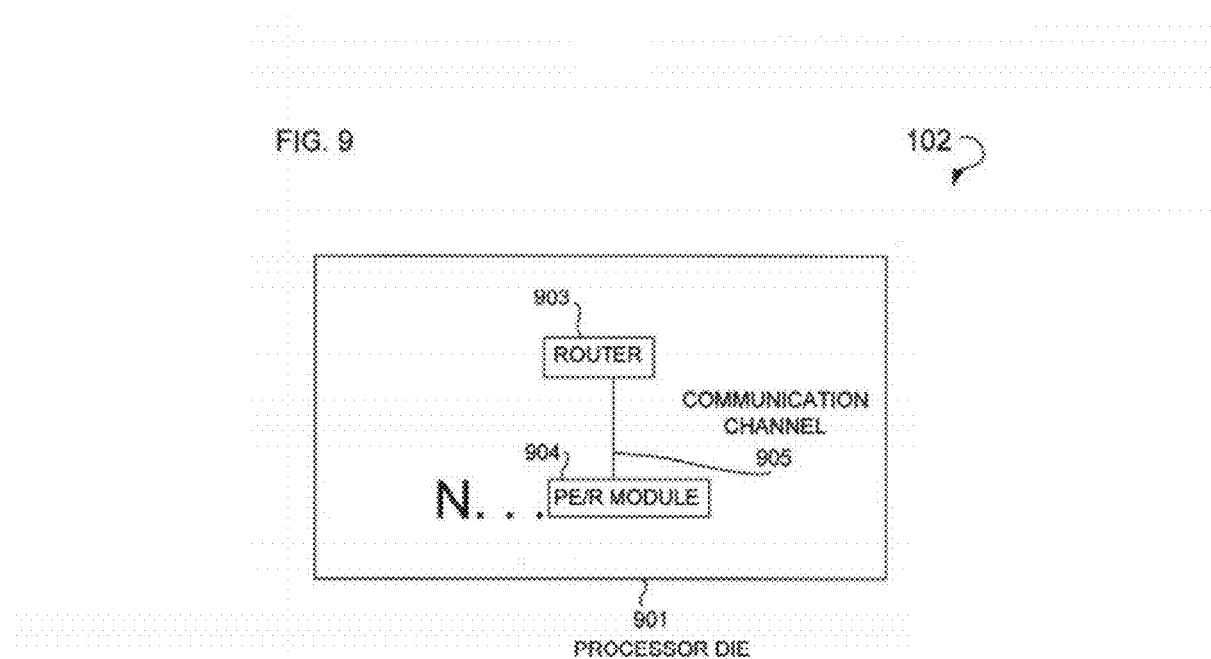
FIG. 9 is a block diagram of a computer system, according to an example embodiment, in the form of the compute blade used to ensure routing across a single domain that includes a plurality of PE/Rs.

FIG. 9 is a block diagram of an example computer system in the form of the compute blade 102 used to ensure routing across a single domain. These various blocks may be implemented in hardware, firmware, or software as part of the computer blade 101, or computer blade 102. Shown is a router 903 that is operatively connected to the processor die 901, to route the data packet 601 to a destination PE/R 904 module. The router 903 is part of a PE/R that is distinct from a PE/R module 904. Both the router 903 and PE/R module 904 reside on a processor die 901. The router 903 is used to identify the destination PE/R module 904 through a global address associated with the destination PE/R module 904. The communication channel 905 operatively connects the router 903 and the destination PE/R module 904 to transmit the data packet 601 to the destination PE/R module 904-based upon the global address. In some example embodiments, transmitting the data packet includes routing the data packet through an intermediate processor die, the intermediate processor die operatively connected to the processor die and another processor die via the communication channel. An intermediate processor die may be a processor die that is positioned along the communication channel between the processor die and another processor die. The router 903 may also be used to retrieve a switch port value based upon the global address that identifies the destination PE/R module 904 for the data packet 601. The router 903 may also associate the switch port value with the data packet to be processed by a switch core that resides on the processor die. The router 903 may also modify a control plane, based upon the global address, which manages the data packet to reflect an address for the destination PE/R module 904. In some example embodiments, the communication channel uses a point-to-point link. Some example embodiments include the router being capable of at least one of layer 1 analysis, layer 2 analyses, or layer 3 analyses as defined within the OSI or TCP/IP models. Further, the global address may be a numeric value that uniquely identifies the destination PE/R module. The PE/R module 904 may include a NI. Some example embodiments include the router 903 routes the data packet to another PE/R module that resides on another processor die.

Figure 10:
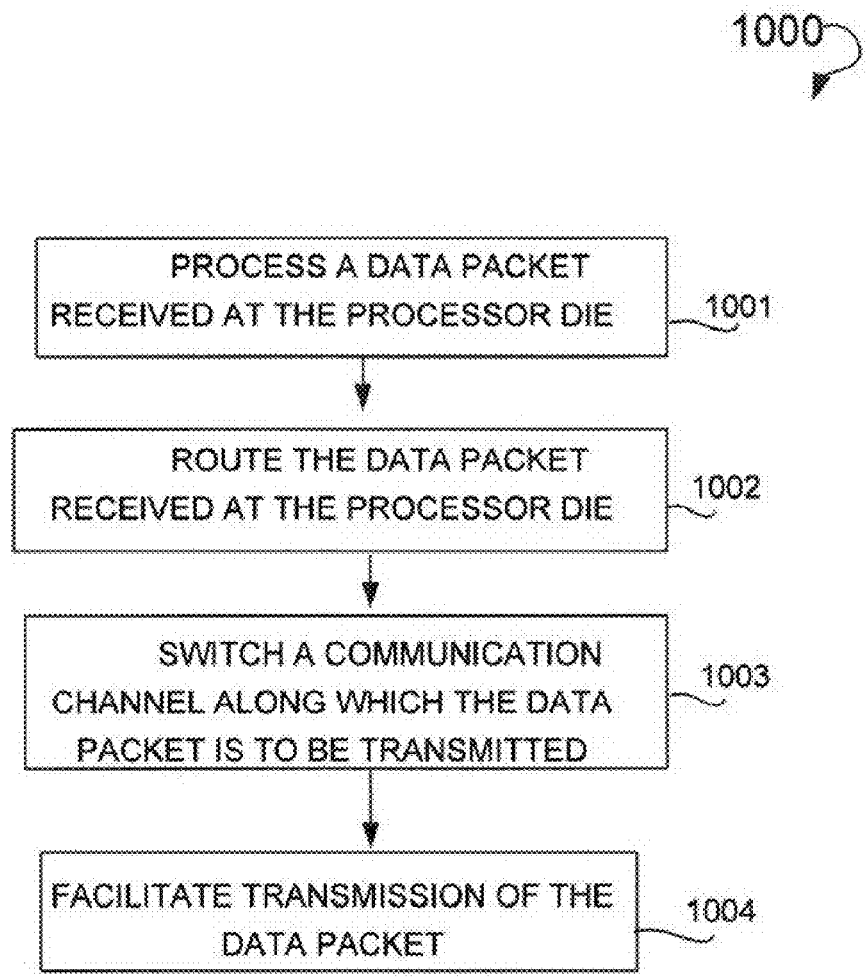
FIG. 10 is a flow chart illustrating a method, according to an example embodiment, to facilitate on-chip and chip-to-chip routing on a compute blade.

FIG. 10 is a flow chart illustrating an example method 1000 to facilitate on-chip and chip-to-chip routing on a compute blade. An operation 1001 is executed by the processor element 703 to process a data packet received at the processor die 705. Operation 1002 is executed by the router 704 to route the data packet received at the processor die 705. Operation 1003 is executed by the switch core 702 to switch a communication channel along which the data packet is to be transmitted. In some example embodiments, the processor element 703 is a resource on the processor die 705 that utilizes the data packet as transmitted across the communication channel. In some example embodiments the router 704 residing on the processor die 705 routes the data packet to another processor element residing on another processor die. Additionally, in some example embodiments, the switch core 702 switches the communication channel along which the data packet is transmitted from a first communication channel to a second communication channel, the first communication channel operatively connected to the processor element, and the second communication channel operatively connected to another processor element. Operation 1004 is executed by the NI 706 to facilitate transmission of the data packet. In some example embodiments, the router 704 residing on the processor die includes a priority arbitration module to assign an input priority to the data packet, an address module that retrieves an address for an additional processor element that resides on the processor die, a data packet formatting module that associates the address with the data packet, and a distribution module to assign an output priority to the data packet. In some example embodiments, the address is selected from at least one of a switch port header, or a control plane value.

Figure 11:
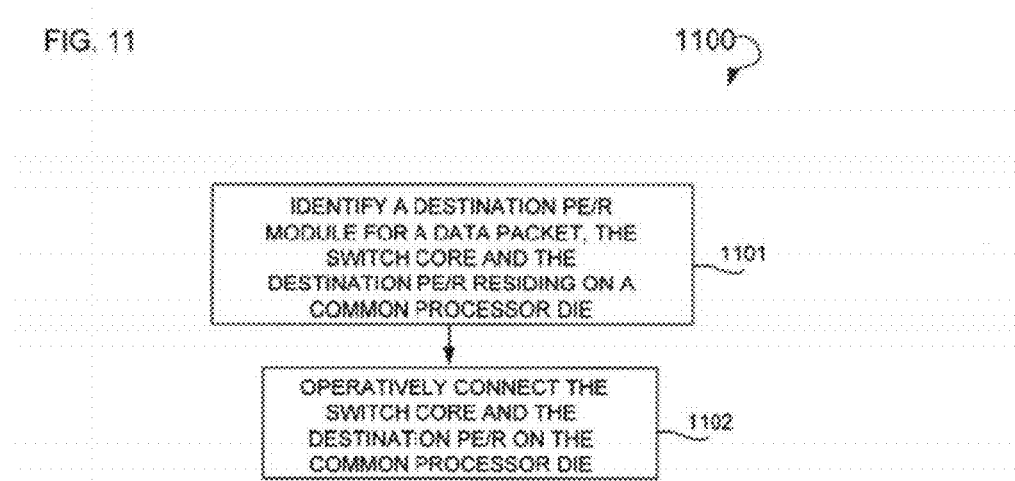
FIG. 11 is a flow chart illustrating a method, according to an example embodiment, used to execute a switch core.

FIG. 11 is a flow chart illustrating an example method 1100 used to execute a switch core. This method may be implemented by the computer blade 101 or 102. Shown is an operation 1101 executed by the switch core 802 to identify a destination PE/R module for a data packet, the switch core 802 and the destination PE/R module 801 residing on a common processor die. An operation 1102 is executed by the switch core 802 on a communication channel to operatively connect the switch core and the destination PE/R module 801 on the common processor die. In some example embodiments, the switch core includes a switch module that is executed to identify the destination PE/R module 801 for a data packet based upon an address for the PE/R module 801. Further, a switch scheduling module may be executed by the switch core 802 to determine an output priority for the data packet to be transmitted across the communication channel. In some example embodiments, the address is a switch port value for the destination PE/R module 801. Some example embodiments the communication channel include at least one of a copper-based communication channel, a fiber-based communication channel, or a photonic-crystal-based communication channels.

Figure 12:
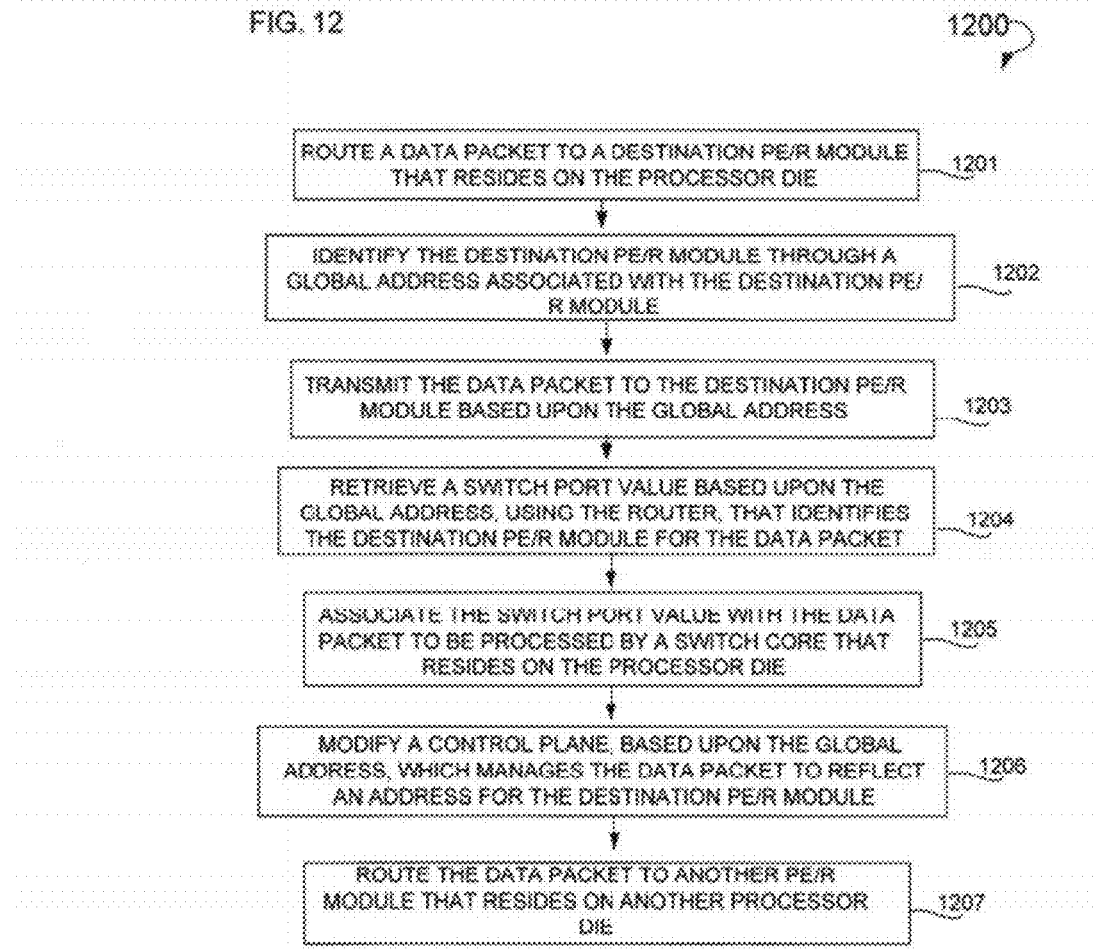
FIG. 12 is a flow chart illustrating a method, according to an example embodiment, used to route data packets using a PE/R and switch core on a processor die.

FIG. 12 is a flow chart illustrating an example method 1200 used to route data packets using a PE/R and switch core on a processor die. This method 1200 may be executed by a computer blade 101 or 102. Shown is an operation 1201 that is executed to route a data packet, using the router 903, to a destination PE/R module that resides on the processor die 901. Operation 1202 is executed by the router 903 to identify the destination PE/R module through a global address associated with the destination PE/R module. Operation 1203 is executed on a communication channel to transmit the data packet to the destination PE/R module based upon the global address. In some example embodiments, the transmission of the data packet includes routing the data packet through an intermediate processor die, the intermediate processor die operatively connected to the processor die and another processor die via the communication channel. An operation 1204 is executed by the router 903 retrieve a switch port value based upon the global address, using the router that identifies the destination PE/R module for the data packet. Operation 1205 is executed by the router 903 to associate the switch port value with the data packet 601 to be processed by a switch core that resides on the processor die 901. Operation 1206 is executed by the router 903 to modify a control plane, based upon the global address, which manages the data packet to reflect an address for the destination PE/R module. In some example embodiments, the communication channel uses a point to point link. Some example embodiments include the router 903 being capable of at least one of layer 1 analysis, layer 2 analyses, or layer 3 analyses. In some example embodiments, the global address is a numeric value that uniquely identifies the destination PE/R module. The PE/R module may include a network interface card. Additionally, the router 903 may reside on the processor die, and the destination PE/R module resides on another processor die. An operation 1207 is executed by the router 903 to route the data packet to another PE/R module that resides on another processor die.

Figure 13:
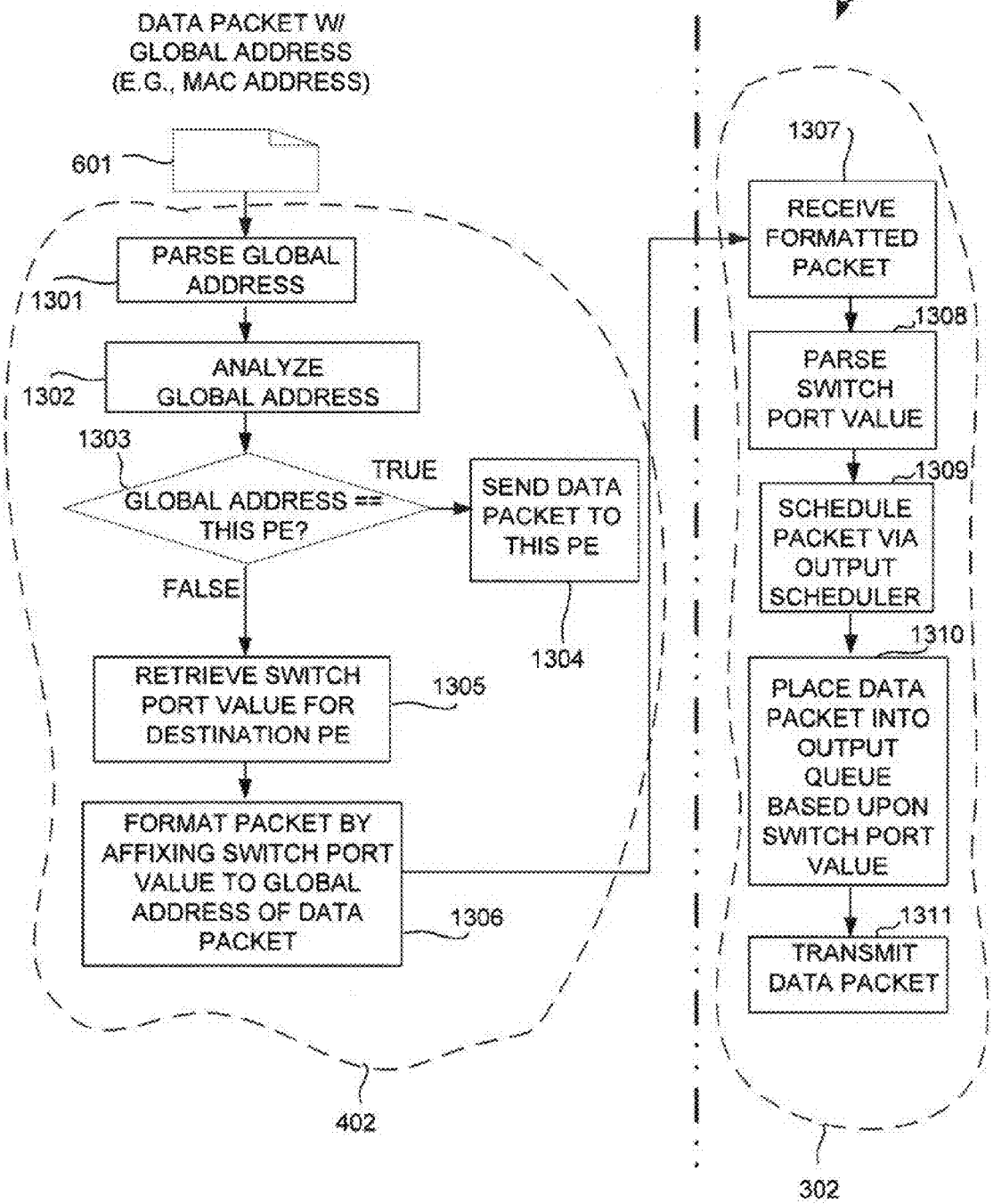
FIG. 13 is a dual-stream flow chart illustrating a method, according to an example embodiment, utilized to facilitate on-chip and chip-to-chip routing.

FIG. 13 is a dual-stream flow chart illustrating an example method 1300 that is utilized to facilitate on-chip and chip-to-chip routing. Shown are various operations 1301 through 1306 that are executed by the router 402. Also shown are operations 1307 through 1311 that are executed by the switch core 302. In some example embodiments, data packet 601 is parsed through the execution of operation 1301. This parsing retrieves a global address associated with the data packet 601. This global dress may be a MAC address. An operation 1302 is executed to analyze (e.g., extract) the global address to determine whether the data packet 601 is intended for receipt by the PE associated with the router receiving data packet 601. Decisional operation 1303 is executed to determine whether the global address is the address of this particular PE (e.g., the PE 401 associated with the router 402). In cases where decisional operation 1302 evaluates to "true" operation 1304 is executed to send data packets to be processed by this PE. For example, the data packet 601 received by the router 402 may be processed by the PE 401. The data packet 601 is sent along the communication channel 407 to be processed by PE 401. In cases where decisional operation 1303 evaluates to "false," an operation 1305 is executed that retrieves a switch port value for a destination PE. The switch port value may be a numeric value between 0 and 31, where each number in this range represents a particular PE or PE/R. An operation 1306 is executed to format a data packet by affixing a switchboard value header to the global address header of the data packet. In the alternative, formatting may include flipping bit values included within the global address to reflect the destination address of PE/R within the processor die 201. Additionally, in the alternative bit values within the control plane for the PE/R may be modified to reflect the destination address for the data packet. The operation 1306 generates a formatted data packet.

In some example embodiments, an operation 1307 is executed to receive a formatted data packet. An operation 1308 is executed to parse, or otherwise retrieve the switch port value from the formatted data packet. An operation 1309 is executed to schedule a packet delivery via an output scheduler such as, for example, switch scheduling module 504. Scheduling, as previously illustrated, may include organizing (e.g., assigning a value to) the data packets such that the data packets may be organized in a particular order in a queue. In some example embodiments, this particular order is based upon QoS requirements. Operation 1310 is executed to place the data packet into an output queue based upon QoS requirements and a switch port value. An output queue may exist for each PE/R on the processor die 201. Operation 1311 is executed to transmit the data packet to a particular PE/R.

Figure 14:
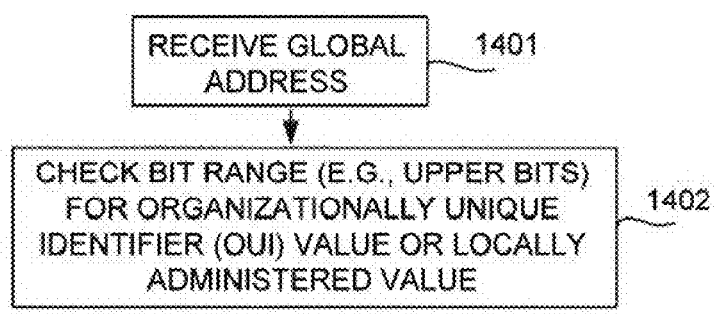
FIG. 14 is a flowchart illustrating the execution of an operation, according to an example embodiment, executed to analyze the global address.

FIG. 14 is a flowchart illustrating the execution of an example operation 1302. Shown is an operation 1401 that is executed to receive a global address. An operation 1402 is executed to extract the global address. In some example embodiments, bit shifting, or the parsing of the global address is performed to extract the global address for analysis to determine the destination PE/R. Analysis of this global address may include determining whether as portion of this global address is an Organizationally Unique Identifier (OUI), or a locally administered value (e.g., allocated by the processor die or by a system administrator).

Figure 15:
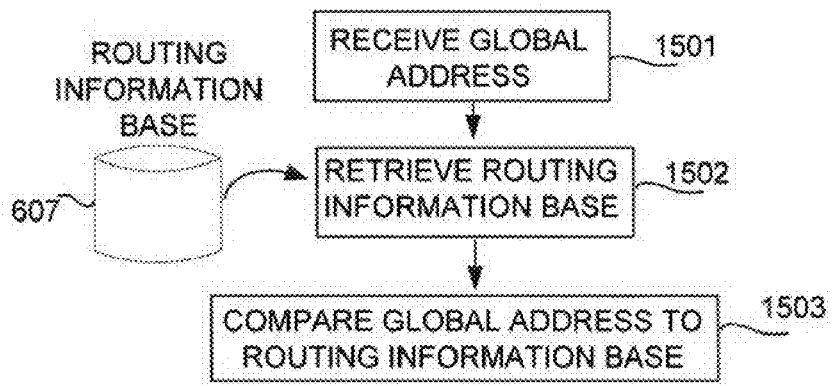
FIG. 15 is a flowchart illustrating an execution of operation, according to an example embodiment, to analyze global address.

FIG. 15 is a flowchart illustrating an example execution of operation 1302. Shown is an operation 1501 is executed receive a global address. An operation 1502 is executed to retrieve the information from the routing information base 607 regarding a shortest path to a destination PE/R. An operation 1503 is executed that compares a global address to the retrieved information.

Figure 16:
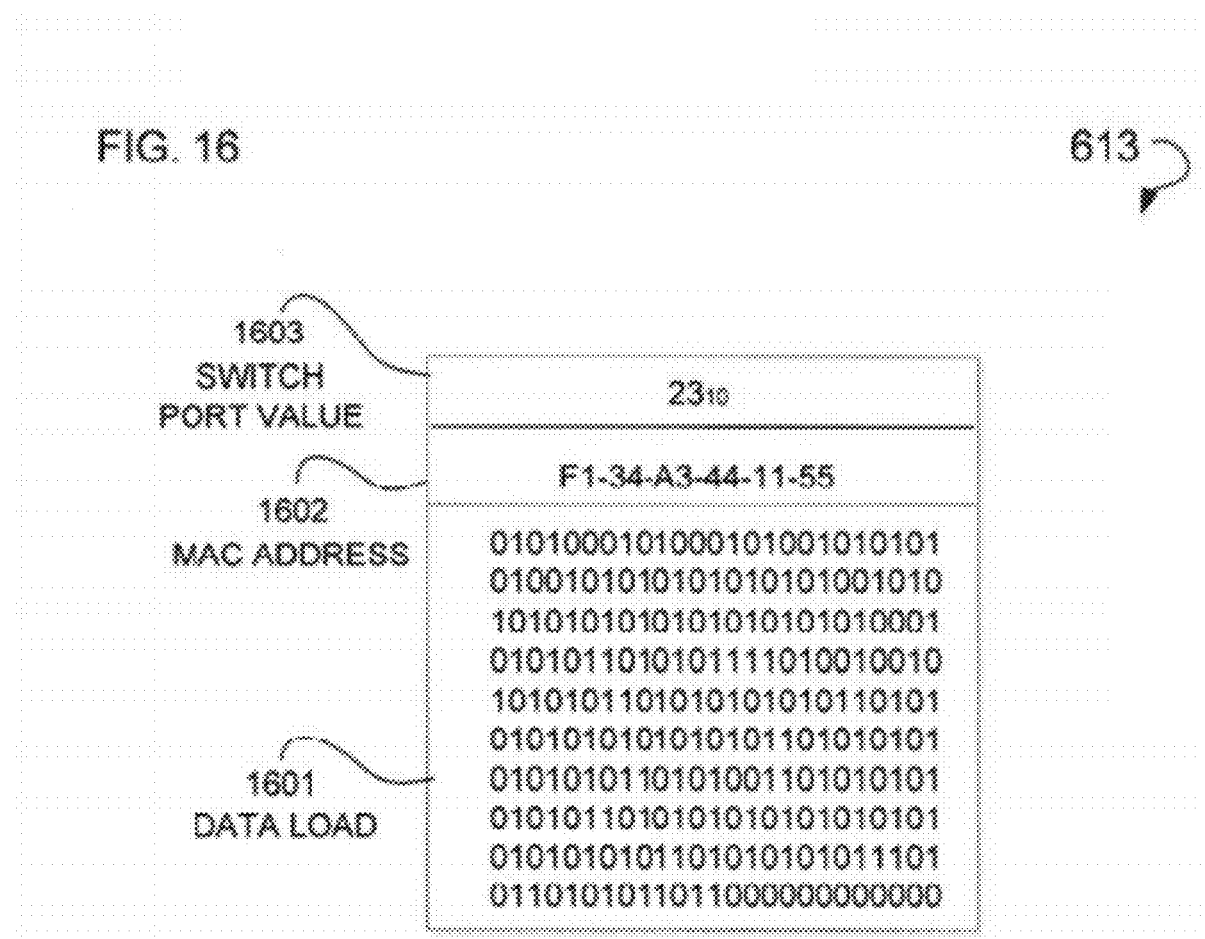
FIG. 16 is a diagram of a data packet, according to an example embodiment, with a global address switching tag.

FIG. 16 is a diagram of an example data packet with a global address switching tag 613. Illustrated is a switch port value 1603 that is associated or otherwise affixed to a global address in the form of a MAC address field 602. The switch port value reflects the address of a particular PE/R. Also shown is a data load 1601 that is to be processed by a destination a PE. The load may include a referent to a memory location (e.g., a pointer), or actual data in the form of a message to be processed.

In some example embodiment, the methods and operations disclosed herein are stored on computer readable media or mediums. Data and instructions (of the software) are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs). Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In some example embodiments, a removable physical storage medium is a single medium, and the term "machine-readable medium" should be taken to include a single medium or multiple medium (e.g., a centralized or distributed database, and/or associated caches and servers or compute blades) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer system comprising:
   a processor element residing on a processor die to process a data packet received at the processor die;
   a router residing on the processor die to route the data packet received at the processor die, wherein the router comprises:
      a priority arbitration module to assign an input priority to the data packet;
      an address module that retrieves an address for an additional processor element that resides on the processor die;
      a data packet formatting module that associates the address with the data packet; and
      a distribution module to assign an output priority to the data packet; and
   a switch core residing on the processor die to switch a communication channel along which the data packet is to be transmitted.

2. The computer system of claim 1, wherein the processor element is a resource on the processor die that utilizes the data packet as transmitted across the communication channel.

3. The computer system of claim 1, wherein the router routes the data packet to another processor element residing on another processor die.

4. The computer system of claim 1, wherein the switch core switches the communication channel along which the data packet is transmitted from a first communication channel to a second communication channel, the first communication channel operatively connected to the processor element, and the second communication channel operatively connected to another processor element.

5. The computer system of claim 1, further comprising a Network Interface (NI) residing on the processor die to facilitate transmission of the data packet.

6. The computer system of claim 1, wherein the address is selected from at least one of a switch port header, or a control plane value.

7. A computer system comprising:
   a switch core to identify a destination processing element and router (PE/R) module for a data packet, the switch core and the destination PE/R module residing on a common processor die, the destination PE/R module including a processing element and a router, wherein the router comprises:
      a priority arbitration module to assign an input priority to the data packet;
      an address module that retrieves an address for an additional processor element that resides on the processor die;
      a data packet formatting module that associates the address with the data packet; and
      a distribution module to assign an output priority to the data packet; and
   a communication channel to operatively connect the switch core and the destination PE/R module on the common processor die.

8. The computer system of claim 7, wherein the switch core includes:
   a switch module to identify the destination PE/R module for a data packet based upon an address for the PE/R module; and
   a switch scheduling module to determine an output priority for the data packet to be transmitted across the communication channel.

9. The computer system of claim 8, wherein the address is a switch port value for the destination PE/R module.

10. The computer system of claim 7, wherein the communication channel includes at least one of a copper-based communication channel, or a silicon waveguide based communication channel.

11. A computer implemented method comprising:
   routing a data packet, using a router that resides on a processor die, to a destination processing element and router (PE/R) module that resides on the processor die;
   identifying, using the router, the destination PE/R module through a global address associated with the destination PE/R module;
   transmitting the data packet, using a communication channel, to the destination PE/R module based upon the global address;
   retrieving a switch port value based upon the global address, using the router, that identifies the destination PE/R module for the data packet; and associating the switch port value with the data packet to be processed by a switch core that resides on the processor die.

12. The computer implemented method of claim 11, wherein transmitting the data packet includes routing the data packet through an intermediate processor die, the intermediate processor die operatively connected to the processor die and another processor die via the communication channel.

13. The computer implemented method of claim 11, further comprising modifying, using the router, a control plane, based upon the global address, which manages the data packet to reflect an address for the destination PE/R module.

14. The computer implemented method of claim 11, wherein the communication channel uses a point to point link.

15. The computer implemented method of claim 11, wherein the router is capable of at least one of layer 1 analysis, layer 2 analysis, or layer 3 analysis.

16. The computer implemented method of claim 11, wherein the global address is a numeric value that uniquely identifies the destination PE/R module.

17. The computer implemented method of claim 11, wherein the PE/R module includes a Network Interface (NI).

18. The computer implemented method of claim 11, further comprising routing the data packet, using the router, to another PE/R module that resides on another processor die.

* * * * *